(12) United States Patent
Burbidge et al.

(10) Patent No.: US 10,849,181 B2
(45) Date of Patent: Nov. 24, 2020

(54) NR RRC CONNECTION SETUP OPTIMISATION

(71) Applicant: Apple Inc., Cupertino, CA (US)

(72) Inventors: Richard C. Burbidge, Shrivenham (GB); Seau S. Lim, Swindon (GB); Sudeep K. Palat, Cheltenham (GB); Yi Guo, Shanghai (CN)

(73) Assignee: Apple Inc., Cupertino, CA (US)

( * ) Notice: Subject to any disclaimer, the term of this patent is extended or adjusted under 35 U.S.C. 154(b) by 38 days.

(21) Appl. No.: 16/242,715

(22) Filed: Jan. 8, 2019

(65) Prior Publication Data

US 2019/0215887 A1 Jul. 11, 2019

Related U.S. Application Data

(60) Provisional application No. 62/616,141, filed on Jan. 11, 2018.

(51) Int. Cl.
*H04W 76/19* (2018.01)
*H04W 76/27* (2018.01)
*H04W 48/14* (2009.01)
*H04W 76/11* (2018.01)
*H04W 76/10* (2018.01)
*H04W 24/02* (2009.01)

(52) U.S. Cl.
CPC ........... *H04W 76/19* (2018.02); *H04W 48/14* (2013.01); *H04W 76/10* (2018.02); *H04W 76/11* (2018.02); *H04W 76/27* (2018.02); *H04W 24/02* (2013.01)

(58) Field of Classification Search
CPC ..... H04W 76/19; H04W 76/10; H04W 76/11; H04W 48/14; H04W 76/27; H04W 24/02
See application file for complete search history.

(56) References Cited

U.S. PATENT DOCUMENTS

2018/0035484 A1* 2/2018 Kim ............... H04W 76/19
2018/0092156 A1* 3/2018 Kim ............... H04W 72/0406

* cited by examiner

*Primary Examiner* — Dady Chery
(74) *Attorney, Agent, or Firm* — Kowert, Hood, Munyon, Rankin & Goetzel, P.C.

(57) ABSTRACT

Systems and methods of optimizing NR RRC connection establishment are described. The UE transmits a RRC request for establishment of a connection to a gNB. The RRC request is transmitting on a SRB1 rather than SRB0. The SRB1 has a default SRB1 configuration stored in memory. A response from the gNB is received and acknowledged using the SRB1 or a SRB1 having a SRB1 configuration provided in the response. The RRC request is a RRCReestablishmentRequest or RRCResumeRequest.

20 Claims, 5 Drawing Sheets

NR RRC CONNECTION SETUP OPTIMISATION

PRIORITY CLAIM

This application claims the benefit of priority wider 35 U.S.C. 119(e) to U.S. Provisional Patent Application Ser. No. 62/616,141, filed Jan. 11, 2018, which is incorporated herein by reference in its entirety.

TECHNICAL FIELD

Embodiments pertain to radio access networks (RANs). Some embodiments relate to cellular networks, including Third Generation Partnership Project Long Term Evolution (3GPP LTE) networks and LTE advanced (LTE-A) networks, $4^{th}$ generation (4G) networks and $5^{th}$ generation (5G) or next generation (NG) networks. Some embodiments relate to improvements in radio resource control (RRC) setup in new radio (NR) networks.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. While the advent of any new technology, especially the introduction of a complex new communication system engenders a large number of problems both in the system itself and in compatibility with previous systems and devices, issues continue to abound in existing systems. For example, the ability of UEs to connect with the network is designed and optimized around the worst case scenario for existing 3GPP networks rather than for the NG network.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
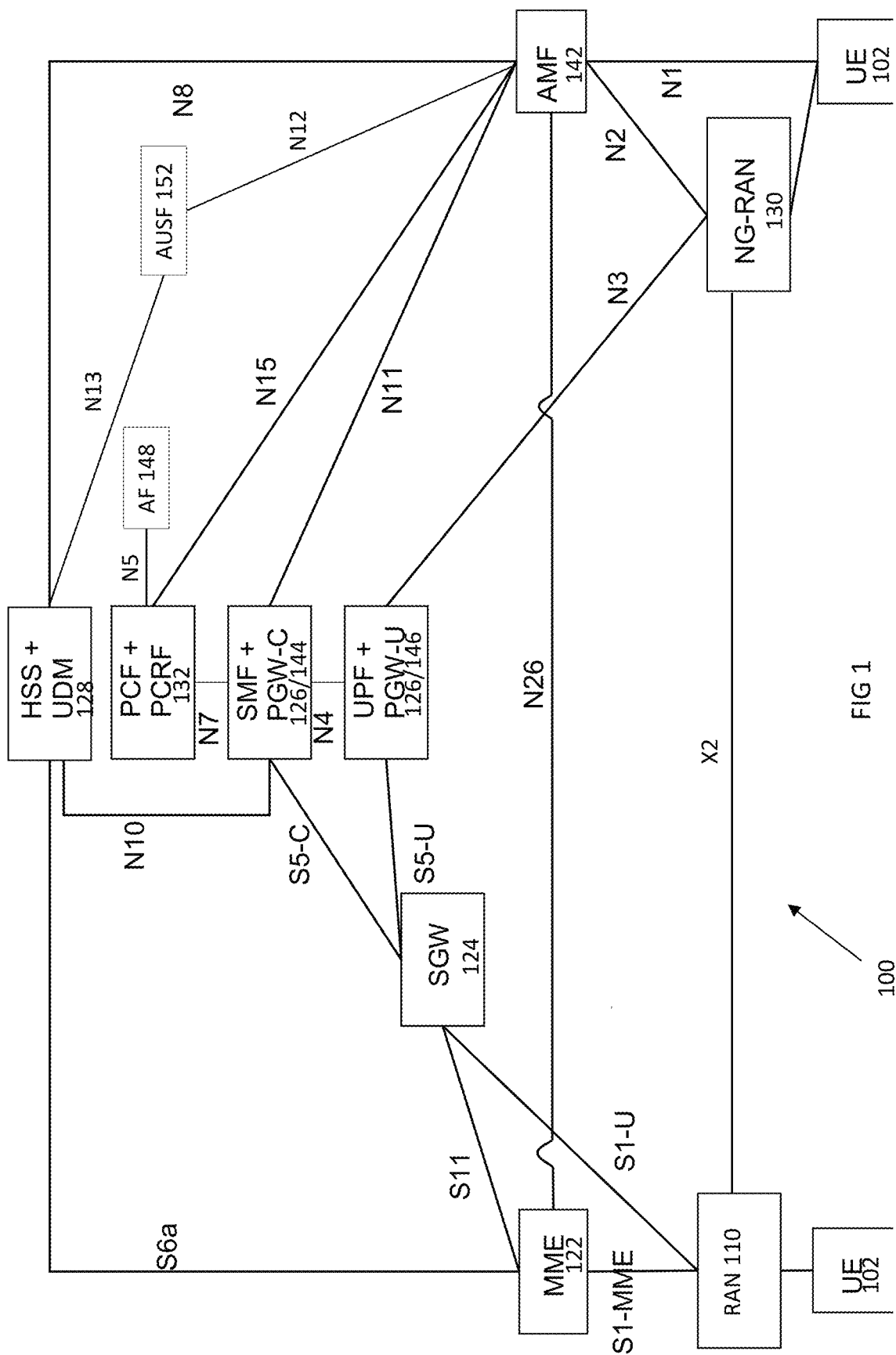
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SW) 144, a Policy Control Function (PCF) 132, an Application Function (AF) 148, an Authentication Server Function (AUSF) 152 and User Data Management (UDM) 128. The various elements are connected by the NG reference points Shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102, To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN, The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
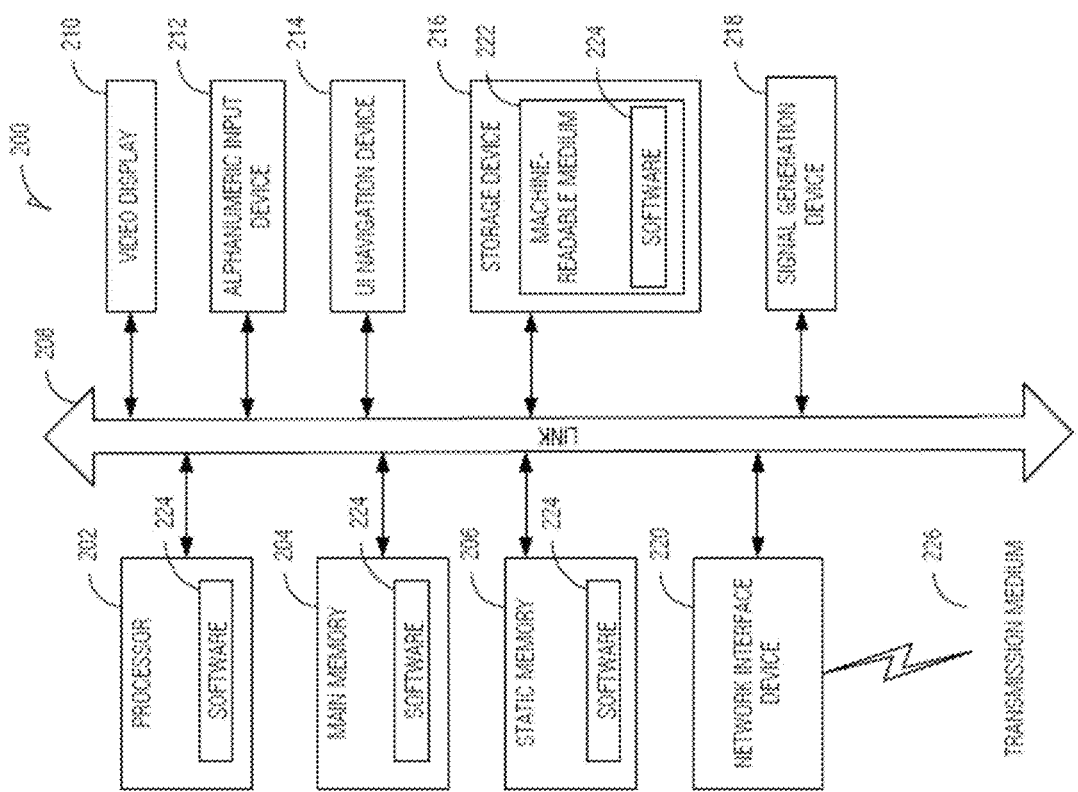
FIG. 2 illustrates a block diagram of a communication device in accordance with some embodiments.

FIG. 2 illustrates a block diagram of a communication device in accordance with some embodiments. In some embodiments, the communication device may be a peer machine in peer-to-peer (P2P) (or other distributed) network environment. The communication device 200 may be a specialized computer, a personal or laptop computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Figure 3:
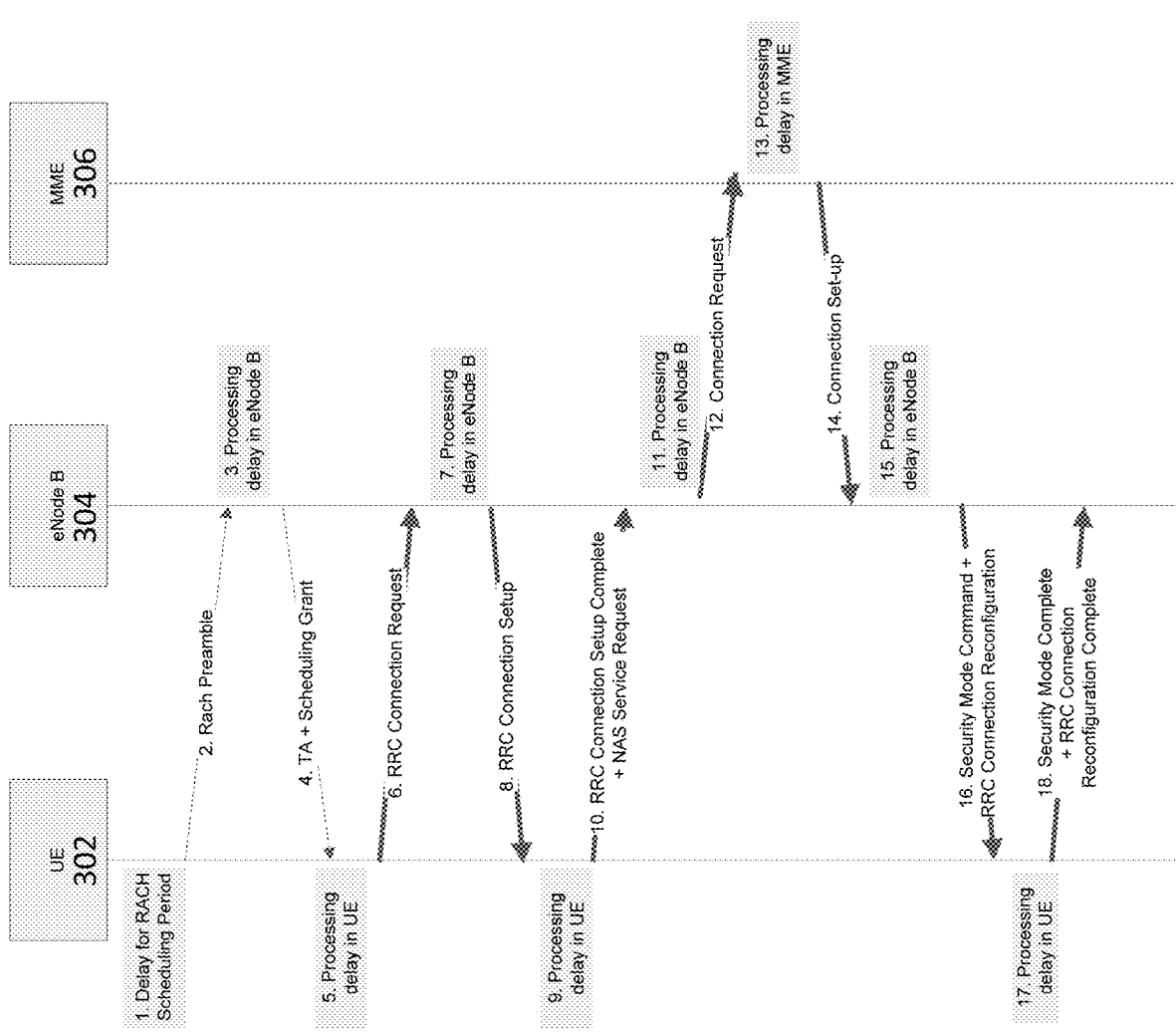
FIG. 3 illustrates control-plane flow for an idle mode to connected mode transition in accordance with some embodiments.

FIG. 3 illustrates control-plane flow for an idle mode to connected mode transition in accordance with some embodiments. The control plane flow shows LTE messages between a UE 302 and eNB 304, as well as between the eNB 304 and MME 306 for the UE 302 to enter the connected mode from the idle mode. The RACH Request may be the first message in the RACH procedure. In general, a UE in the RACH group may synchronize to the network using the RACH procedure. The Physical Random Access Channel (PRACH) may be provided for initial access by the UE to the network when the UE is in the RRC idle state. The RACH procedure may also be used under other circumstances, such as RRC connection re-establishment, Resume or handover.

The RACH request may be transmitted by the UE 302 to the eNB 304 using a RACH resource. For example, the RACH request may be transmitted over 6 Resource blocks. The RACH request may contain a preamble index, which may be randomly selected based on the size of the RRC connection request from preamble information in system information block (SIB).

The eNB 304, having received the RACH request may allocate a temporary Cell Radio Network Temporary Identifier (C-RNTI) for the UE 302. The temporary Cell RNTI may be transmitted to the UE 302 in a RACH Response message (RAR-msg 2) from the eNB 304. The RAR message may also contain the appropriate timing advance (TA) for the UE 302, determined by the eNB 304. The RAR message may contain a scheduling grant for the UE 302 to send a RRC connection request, where the scheduling grant may indicate Whether frequency hopping is to be used as well as the resource block assignment. The RAR message may further indicate the modulation and coding scheme and the power for the PUSCH to be used by the UE 302.

The randomly selected random access preamble may not enable unique identification of the UE 302, leaving the possibility that multiple UEs 302 may attempt to initiate the random access procedure with the same preamble sequence on the same channel. A contention resolution phase may help to uniquely identify the UE 302 that has been selected. The UE 302, having received the RAR message, may transmit the RRC connection request to the eNB 304 that can also be used for a contention resolution (msg 3). Message 3 may contain a TMSI value, Random Number or the temporary C-RNTI.

The eNB 304 may respond to the RRC Connection Request with a RRC Connection Setup message (msg 4). The RRC Connection Setup message may also be addressed with the Temporary C-RNTI of the UE 302. The message may also contain the Random Number to confirm that the RRC Connection Request is directed to the UE 302. The UE 302 may, in response to the RRC Connection Request, acknowledge the RRC Connection Setup with a Hybrid ARQ ack or a RRC Connection Setup Complete message msg 5). The UE 302 may also send a non-access stratum (NAS) service request message with the RRC Connection Setup Complete message.

The eNB 304, in response to having received the RRC Connection Setup Complete message, may transmit a connection request for the UE 302 to the MME 306. The MME 306 may respond to the connection request with a connection set-up to the eNB 304.

The eNB 304 may then transmit to the UE 302a security mode command (SMC) and RRC Connection Reconfiguration message. The UE 302 may in response transmit to the eNB 304 a security mode complete and RRC Connection Reconfiguration Complete message. The SMC provides, for example, the security algorithm to use as well as key generation.

The LTE connection request is designed and optimized around the worst case msg 3 size of 48 bits. Transmission of the service request is a time critical procedure for the idle-active transition. The LTE design has accordingly taken extra care to optimize this procedure. To this end, msg 3 carries TMSI, the NAS UE ID, which is unique within the TA list. The NAS UE ID is also used for contention resolution, guaranteeing no further collision after msg 4 (contention resolution).

RACH msg 4 may include the contention resolution control element (CE) and also RRC connection setup message that sets up Signalling Radio Bearer1 (SRB1). SRBs are RBs that are used only for the transmission of RRC and NAS messages. SRB0 is for RRC messages using the Common Control Channel (CCCH) logical channel used during the initial setup, while SRB1 is for RRC messages as well as for NAS messages prior to the establishment of SRB2, all using the Dedicated Control Channel (DCCH) logical Channel after these SRBs are configured. Once security is activated, all RRC messages on SRB1, including those containing NAS messages, are integrity protected and ciphered by PDCP (neither integrity protection nor ciphering is provided for SRB0). The use of SRB1 may permit functionalities such as segmentation, concatenation and retransmission to be used, unlike SRB0, during transmission of the relevant message. The UE may send the RRC Connection Setup Complete with the initial direct transfer NAS message in RACH msg 5. Further efficiency may be achieved by removing duplication of information between msg 3 and msg 5 by using the UE ID provided in msg 3 to send to the MME 306 over the S1-AP interface between the eNB 304 and the MME 306.

On receipt of the UE Context containing the security and UE capability information, the eNB 304 may send the RRC SMC and RRC reconfiguration message to the UE 302. These messages may be concatenated to further reduce delay.

As FIG. 3 shows, it is still not possible to contact the core network until after reception of msg 5 because the information used for NAS is only available in msg 5. This procedure is associated with the following delays, shown in FIG. 3 and captured in Table 1.

TABLE 1

| 7 | Processing delay in eNB (L2 and RRC) | 4 | 4 |
|---|---|---|---|
| 8 | Transmission of RRC Connection Setup (and UL grant) | 1 | 1 |
| 9 | Processing delay in the UE (L2 and RRC) | 15 | 15 |
| 10 | Transmission of RRC Connection Setup complete (including NAS Service Request) | 1 | 1 |
| 11 | Processing delay in eNB (Uu -> S1-C) | 4 | 4 |

Msg 5 may also be optimized to reduce message size for the service request. However, over various 3GPP releases, the msg 5 size has crept up, increasing the transmission delay of msg 5 and hence leading to increased delay in contacting the core network. Much of the new information added in these releases can be eliminated to contact the core network during the service request procedure.

It is not possible to further reduce the idle-active transition delay, even if a larger msg 3 size is possible, because only message size is defined for the RRC connection request (note that the RRC resume request already defines multiple message sizes). The multi-step set up procedures for Signaling Radio Bearer (SRB1) (using the RRC connection setup), followed by SMC and another RRC reconfiguration to set up SRB2 and Dedicated Radio Bearers (DRBs) also add delay to the idle-active transition in LTE. Reducing the signaling procedures and messages above can reduce the signaling and idle-active transition delay.

The LTE idle-active transition, while fairly optimal, can be further optimized in terms of signaling and idle-active transition delay. This can be useful, especially for NR networks where the idle-active transition delay is more problematic than LTE. As shown in Table 1 above, about 20 ms of the idle-active transition can be reduced by avoiding msg 3 to msg 5 delay for initiating the connection to the core network. It would also be useful to include other information early. In some embodiments, some of the contents of msg 5 may be transmitted in an earlier msg. Note in addition that a similar use may be applied to reduce the delay in the inactive-active transition in which the UE connection is resumed or during re-establishment following a failure in connection (i.e., for scenario where the RAN retains the UE context) as well as for an initial UE connection (idle-active transition).

A portion of the information elements (IEs) of the RRC connection setup complete message (msg 5) is shown below:

The working group CT1 has also defined an extended service request to be used for circuit switched fallback (CSFB) and other services. The extended service request is of larger size where a normal service request cannot be used. Knowledge of the NAS message sizes for NR communications is useful to design the connection establishment optimally.

For other initial transfer messages, such as NAS tracking area update (TAU), for which timing is of less import, the current procedure can be re-used. While transfer of the remaining information in msg 5 can occur while the UE context is being retrieved from the core network, it would be helpful for the network to receive some of the information, if available, early. This information may include, for example: some or all of the UE capability, the coverage extension status, the mobility state, and the number of cause values could also be dependent on the size available, making it possible to directly use the access barring call types as cause values without using further mapping. Considering the size of NAS message and other information, both together could come to about 40 bits.

Using LTE as an example, it could be useful to send about 40 bits early as discussed above. Some possible solutions to early transfer of information from msg 5 are discussed below.

In some embodiments, the RACH msg 3 size may be increased. Increasing msg 3 size may be possible without significantly increasing delay from HARQ retransmissions. Increasing the RACH msg 3 size by about 40 bits, if

```
selectedPLMN-Identity            INTEGER (1..maxPLMN-r11),
registeredMME                    RegisteredMME
OPTIONAL,
dedicatedInfoNAS                 DedicatedInfoNAS,
gummei-Type-r10                  ENUMERATED {native, mapped}
OPTIONAL,
rlf-InfoAvailable-r10            ENUMERATED {true}
OPTIONAL,
logMeasAailable-r10              ENUMERATED {true}
OPTIONAL,
rn-SubframeConfigReq-r10         ENUMERATED {required, notRequired}
OPTIONAL,
connEstFailInfoAvailable-r11     ENUMERATED {true}             OPTIONAL,
mobilityState-r12                ENUMERATED {normal, medium, high, spare}
OPTIONAL,
mobilityHistoryAvail-r12         ENUMERATED {true}             OPTIONAL,
logMeasAvailableMBSFN-r12        ENUMERATD {true}              OPTIONAL,
ce-ModeB-r13                     ENUMERATED {supported}
OPTIONAL,
s-TMSI-r13                       S--TMSI
OPTIONAL,
attachWithoutPDN-Connectivity-r13 ENUMERATED {true}
OPTIONAL,
up-CIoT-EPS-Optimisation-r13     ENUMERATED {true}
OPTIONAL,
cp-CIoT-EPS-Optimisation-r13     ENUMERATED {true}
OPTIONAL,
ue-CE-NeedULGaps-r13             ENUMERATED {true}
OPTIONAL,
dcn-ID-r14                       INTEGER (0..65535)            OPTIONAL,
```

Of the above, the dedicatedInfoNAS IE is the sole IE used to contact the core network. The dedicatedInfoNAS IE is an octet string that is used to transfer UE-specific NAS layer information between the network and the UE. The RRC layer is transparent for this information. For the service request, the NAS message size is 32 bits. If the NAS message size is of variable size (as in different LTE RRC messages), size information is also provided.

possible, would be relatively easy by simply defining RRC connection request to optionally include the NAS Service Request and other information. Increasing msg 3 size may increase the number of HARQ retransmissions. However, even with increased number of HARQ retransmissions, it may still be faster overall for idle-active transition than sending the information in msg 5. A trade-off between msg 3 size and overall delay for connection setup could also be considered. As there is no possibility for segmentation, the RRC connection request message size may be defined for the worst case msg 3 size.

In some embodiments, msg 3 may be of variable size. In this case, the msg 3 size may depend on various factors, like cell size, UE path loss, delay tolerance etc. While LTE allows an indication of path loss using a RACH partition, it defines only one msg 3 size for the RRC connection request. Hence even if the use of a large msg 3 size is possible, the UE may be unable to include additional RRC fields in msg 3 to reduce call setup time (though two message sizes are already defined for Resume Request).

Different sizes can be considered for the RRC Connection Request. Specifically, one size may be considered for the worst case, and one or more for a larger msg 3 size. The larger message definition can include additional information from msg 5 as discussed above or more information about the UEID. The number of message sizes allowed should be limited to a few discrete sizes to minimize complexity. Thus, two sizes may be defined based on on msg 3 size. The two different RRC connection request message sizes may include additional critical information for connection set up in the larger message. Actual message size and fields to be included should be based on message size.

In some embodiments, a new message, "msg 3.5," may be used if the size of msg 3 cannot be increased sufficiently to accommodate the additional information from msg 5. This can be seen as a RRC level segmentation of a larger msg 3 including the additional relevant fields from msg 5. Msg 3.5 can be sent before the network sends a setup request (msg 4). This saves delay compared to the LTE processes by eliminating the delay associated with the processing of RRC connection request in the network and the RRC connection setup in the UE.

There are a few different ways this can be realized. In some embodiments, the network provides an additional grant for msg 3.5. The additional grant may be in the RAR (msg 2). Alternatively, the network can provide an additional grant after receipt of an indication in msg 3 to send the information from msg 5 or may provide the additional grant automatically after transmission of the RACH preamble. In some embodiment, Msg 3.5 may be sent after contention resolution, after the RACH msg 4 but before RRC connection.

In some embodiments, the step of RRC connection setup message may be eliminated for the NAS Service request to be sent early by adopting a default configuration for SRB1. It would be possible and useful to go directly to SMC+RRC connection reconfiguration (sent from the gNB to the UE) by using a default SRB1 configuration to send the SMC+RRC connection reconfiguration messages. In this case, the default SRB1 configuration could be specified in standard and pre-programmed in memory (updatable through NAS messaging if desired). This could set up the RLC-AM configuration for SRB1. This may allow the transfer of the SMC+RRC connection reconfiguration using a RLC-acknowledged mode, thereby providing reliability and possibility to segment the messages while also reducing the number of messages exchanged and the delay associated with the setup.

Further reconfiguration of SRB1 from the default configuration used by the UE as described above can be done in a subsequent the RRC reconfiguration message. This message can also set up additional SRBs and DRBs. Since the RRC reconfiguration message is sent after the SMC, the RRC reconfiguration message is a secure message and can provide sensitive configuration information. Thus, the two setup procedure of RRC connection setup following by SMC/Reconfiguration may be eliminated and a single step setup procedure may instead be used.

To reiterate, RRC connection establishment involves the configuration and establishment of SRM. The network completes RRC connection establishment prior to completing the establishment of the NG connection, i.e. prior to receiving the UE context information, including the UE capability from the 5GC. Consequently, SRB0 is used and AS security is not activated during the initial phase of the RRC connection. Upon receiving the UE context from the 5GC, the RAN activates AS security (both ciphering and integrity protection) using the initial security activation procedure. The RRC messages to activate security (command and successful response) are integrity protected, while ciphering is started only after completion of the procedure. That is, the response to the message used to activate security is not ciphered, while the subsequent messages (e.g. used to establish SRB2 and DRBs) are both integrity protected and ciphered. After having initiated the initial security activation procedure, the network initiates the establishment of SRB2 and DRBs, i.e. the network may do this prior to receiving the confirmation of the initial security activation from the UE. In any case, the network will apply both ciphering and integrity protection for the RRC reconfiguration messages used to establish SRB2 and DRBs.

Figure 4:
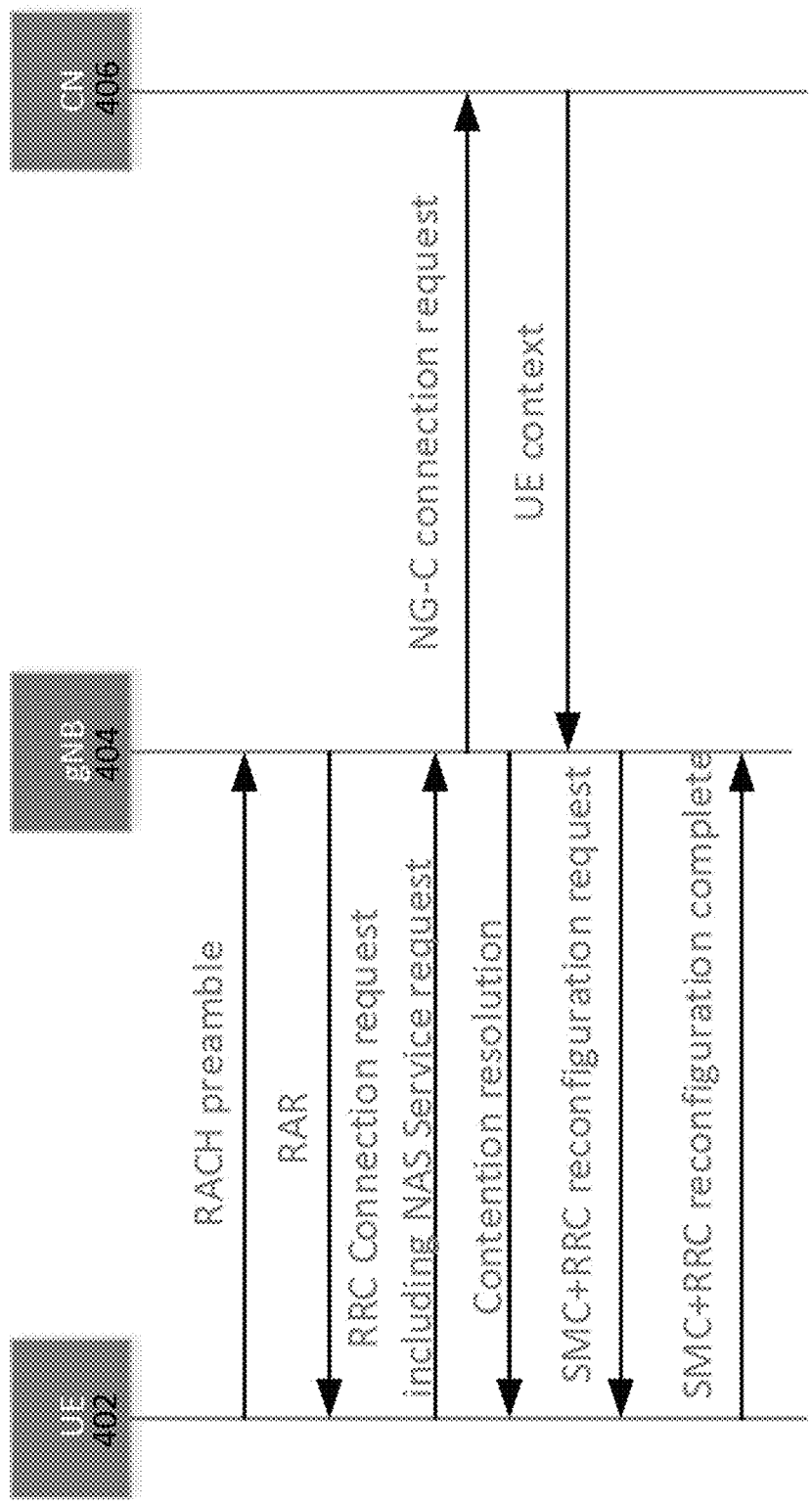
FIG. 4 illustrates a combined procedure in accordance with some embodiments.

FIG. 4 illustrates a combined procedure in accordance with some embodiments. In FIG. 4, the communications between the UE 402 and the network access (shown as gNB 404 for the NG network, but may be an eNB for the LTE network) are reduced. Similar communications may occur between the gNB 404 and the NG core network 406 (e.g., the AMF) as that shown in FIG. 3. As shown, in FIG. 4, several of the messages between the UE 402 and the gNB 404 may be eliminated (similar to msg 3 and 4 from FIG. 3) in the manner described above. This may decrease the delay between initiation of the message sequence by the UE 402 and initiation of the messages between the gNB 404 and the NG core network 406, thereby reducing the delay of the entire process.

As is clear, the reduction in overall delay may be used with LTE/4G networks as well as with NR or 5G/NG networks. In some embodiments, rather than use a SRB0 for one or more of the RRC messages used during connection (e.g., RRCConnectionRequest/RRCSetupRequest or RRC-ConnectionResume), because the SRB1 has not been configured by the network (whether LTE, 4G or NG), a default SRB1 may be defined by specification. This default SRB1 may be used and identified within the particular message. An example of parameters of the default SRB1 are shown in Tables 2 and 3.

TABLE 2

| Name | Value | NB-IoT |
|---|---|---|
| RLC configuration CHOICE ul-RLC-Config | am | am |
| >t-PollRetransmit | ms45 | ms25000 |
| >pollPDU | infinity | N/A |
| >pollByte | infinity | N/A |
| >maxRetxThreshold | t4 | t4 |
| dl-RLC-Config | | |
| >t-Reordering | ms35 | released |
| >t-StatusProhibit | ms0 | N/A |
| >enableStatusReportSN-Gap | N/A | disabled |

TABLE 2-continued

| Name | Value | NB-IoT |
|---|---|---|
| Logical channel configuration | | |
| priority | 1 | 1 |
| prioritisedBitRate | infinity | N/A |
| bucketSizeDuration | N/A | N/A |
| logicalChannelGroup | 0 | N/A |
| logicalChannelSR-Prohibit | N/A | TRUE |

TABLE 3

| | Value | | |
|---|---|---|---|
| Name | SRB1/1S | SRB2/2S | SRB3 |
| PDCP-Config | | | |
| >t-Reordering | | infinity | |
| RLC-Config CHOICE | | Am | |
| ul-RLC-Config | | | |
| >sn-FieldLength | | size-12 | |
| >t-PollRetransmit | | ms45 | |
| >pollPDU | | infinity | |
| >pollByte | | infinity | |
| >maxRetxThreshold | | t8 | |
| dl-RLC-Config | | | |
| >sn-FieldLength | | size12 | |
| >t-Reassembly | | ms35 | |
| >t-StatusProhibit | | ms0 | |
| logicalChannelIdentity | 1 | 2 | 3 |
| LogicalChannelConfig | | | |
| >priority | 1 | 3 | 1 |
| >prioritisedBitRate | | infinity | |
| >logicalChannelGroup | | 0 | |

The use of the default SRB1 to initiate the interaction of the UE with the eNB/gNB (e.g., to provide the NAS service request such as the dedicatedInfoNAS IE or to provide the RRC Connection Setup or SMC or The RRC Reconfiguration message or RRC Resume message to the UE) may reduce the delay in establishing, or resuming, the UE network connection. In the context of the idle-active transition, the uplink grant for msg 3.5 (carrying some of what was previously in msg 5) may be provided in msg 2 in addition to the uplink grant for msg 3. Alternatively, an uplink grant for a message containing merely the dedicatedInfoNAS IE or other information to initiate the eNB/gNB-core network interaction may be provided separately. This grant may be provided before transmission of msg 4. In addition, rather than sending msg 3 using SRB0, the default SRB1 may be used.

Note that in addition to being used for initial attachment, the various embodiments may also be used during other idle-active mode transitions, such as during RRC Connection Reestablishment and Resume. In this case, the UE may initiate RRC connection resumption in response to, for example, NG-RAN paging or upon triggering RAN-based Notification Area (RNA) updates. In addition, fallback to establish a new RRC connection may be used for both of RRC Connection Reestablishment and Resume (including transmission of a RRCSetup message to the network from the UE and RRCSetupComplete by the network to the UE).

The suspension of the RRC connection is initiated by the network. When the RRC connection is suspended, the UE stores the UE AS context and any configuration received from the network, and transits to RRC_INACTIVE state.

The RRC message to suspend the RRC connection is integrity protected and ciphered. The resumption of a suspended RRC connection is initiated by upper layers when the UE needs to transit from RRC_INACTIVE state to RRC_CONNECTED state or by RRC layer to perform a RNA update or by RAN paging from NG-RAN. When the RRC connection is resumed, the network configures the UE according to the RRC connection resume procedure based on the stored UE AS context and any RRC configuration received from the network. The RRC connection resume procedure re-activates security and re-establishes SRB(s) and DRB(s). The resume procedure may use the stored default SRB1 rather than SRB0.

In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to discard the stored context and initiate NAS level recovery (in this case the network sends an RRC setup message).

Full configuration may be used for RRC Connection Reestablishment and Resume. In some cases, both the RRC Connection Reestablishment and Resume procedure may allow either SRB0 or SRB1 messages to be used. Use of SRB1 for msg 4 can speed up the transition by avoiding the use of SRB0 and a subsequent reconfiguration. To be able to receive messages sent over SRB1 in msg4, the UE may already configure and resume SRB1 before msg 4 is received in order to process msg 4. Depending on the scenario, security for the SRB1 may be configured before msg 4 (for Resume) or in msg 4 (for Re-establishment). Thus, the UE may autonomously configure (apart from security depending on scenario) and be able to receive messages on SRB1 before msg 4 is received for the RRC Connection Reestablishment and Resume procedures. In some cases, the UE may, before msg 4, re-use the previous configuration SRB1 that was provided to the UE and what the UE was using prior to sending msg 3.

This may, however, create an issue with the full configuration that could be used for RRC Connection Reestablishment and Resume. The full configuration can be used when the target node does not comprehend the source configuration. In these cases, it may not be possible to use the previous configuration for SRB1. Hence, where relevant, SRB1 may be configured to a default configuration before msg 4 and the default configuration used for the transmission and reception of msg 4. In other embodiments, the applicable network can reconfigure SRB1 to a different configuration in msg 4 or later with the default configuration as the baseline for a change in (delta) configuration.

Reconfiguration of SRB1 and MCG configuration may be provided in the Re-establishment message. The ASN.1 may be modified to include fields in the RRCReestablishment message, in particular, radioBearerConfig and masterCellGroup IEs may be introduced in the RRCReestablishment message for purposes of reconfiguring SRB1.

In some embodiments, the actions related to transmission of the RRCReestablishmentRequest message may include the UE setting the contents of the RRCReestablishmentRequest message to restore the RRC configuration and security context from the stored UE AS context except the SRB1 configuration and establish SRB1 using the default SRB1 configuration. The RRCReestablishmentRequest message may also set the reestablishmentCause to an appropriate value (reconfiguration, handover or other failure) and set the UE c-RNTI, physical cell ID and the short MAC ID.

In some embodiments, the actions related to transmission of the RRCResumeRequest message may include the UE setting the contents of the RRCResumeRequest message to restore the RRC configuration and security context from the stored UE AS context except the SRB1 configuration and establish SRB1 using the default SRB1 configuration.

In some embodiments, message 3 as discussed above, may be transmitted before reception of message 2. The UE may use the default configuration as discussed above for transmission of this message 3 over SRB1 or another RB.

In response to reception by the UE of the RRCReestablishment message, the UE may, if the RRCReestablishment message includes the fullConfig IE, perform the radio configuration procedure as specified in TS 38.331, section 5.3.5.11. Similarly, in response to reception by the UE of the RRCResume message, the UE may, if the RRCResume message includes the fullConfig IE, perform the radio configuration procedure as specified in as specified in TS 38.331, section 5.3.5.11. Otherwise, the UE may restore the Packet Data Convergence Protocol (PDCP) state, reset the COUNT value (an independent counter maintained for each direction and used as input for ciphering and integrity protection for each radio bearer) and re-establish PDCP entities for SRB2 and all DRBs. If drb-ContinueROHC is included, the UE may: indicate to lower layers that the stored UE AS context is used and that the drb-ContinueROHC IE is configured and continue the header compression protocol context for the DRBs configured with the header compression protocol; else the UE may: indicate to lower layers that stored UE AS context is used, reset the header compression protocol context for the DRBs configured with the header compression protocol and discard the stored UE AS context and I-Radio Network Temporary Identifier (RNTI) (used for NR connected to 5GC at NG-RAN level to identify the UE context in RRC_INACTIVE).

The RRCReconfiguration message is the command to modify a RRC connection. The RRCReconfiguration message may convey information for measurement configuration, mobility control, radio resource configuration (including RBs, MAC main configuration and physical channel configuration) including and security configuration. The RRCReconfiguration message received by the UE from the network may use signalling radio bearer SRB1 or SRB3, RLC-SAP AM, logical channel DCCH. The ASN1 text may include:

| RRCReconfiguration message |
| --- |
| -- ASN1START |
| -- TAG-RRCRECONFIGURATION-START |
| RRCReconfiguration ::=      SEQUENCE { |
|   rrc-TransactionIdentifier      RRC-TransactionIdentifier, |
|   criticalExtensions      CHOICE { |
|     rrcReconfiguration      RRCReconfiguration-IEs, |
|     criticalExtensionsFuture      SEQUENCE { } |
|   } |
| } |
| RRCReconfiguration-IEs ::=      SEQUENCE { |
|   radioBearerConfig      RadioBearerConfig |
|         OPTIONAL, -- Need M |
|   secondaryCellGroup      OCTET STRING |
|   (CONTAINING CellGroupConfig)      OPTIONAL, -- Need M |
|   measConfig      MeasConfig |
|         OPTIONAL, -- Need M |
|   lateNonCriticalExtension      OCTET STRING |
|         OPTIONAL, |

| RRCReconfiguration message |
| --- |
| -continued |
|   nonCriticalExtension      RRCReconfiguration-vxx-IEs |
|         OPTIONAL |
| } |
| RRCReconfiguration-vxx-IEs ::=      SEQUENCE { |
|   masterCellGroup      OCTET STRING |
|   (CONTAINING CellGroupConfig)      OPTIONAL, -- Need M |
|   fullConfig      ENUMERATED {true} |
|         OPTIONAL, -- Cond HO |
|   dedicatedNAS-MessageList      SEQUENCE (SIZE(1..maxDRB)) OF |
|   DedicatedInfoNAS      OPTIONAL, -- Cond nonHO |
|   nonCriticalExtension      SEQUENCE { } |
|         OPTIONAL |
| } |
| -- TAG-RRCRECONFIGURATION-STOP |
| -- ASN1STOP |

The RRCReconfiguration IE field descriptions may include:

| RRCReconfiguration-IEs field descriptions |
| --- |
| dedicatedNAS-MessageList |
| This field is used to transfer UE specific NAS layer information between the network and the UE. The RRC layer is transparent for each PDU in the list. |
| fullConfig |
| Indicates that the full configuration option is applicable for the RRCReconfiguration message. |
| masterCellGroup |
| Configuration of master cell group. |
| radioBearerConfig |
| Configuration of Radio Bearers (DRBs, SRBs) including SDAP/PDCP. In EN-DC this field may only be present if the RRCReconfiguration is transmitted over SRB3. |
| --secondaryCellGroup |
| Configuration of secondary cell group (EN-DC). |

| Conditional presence | Explanation |
| --- | --- |
| nonHO | The field is not present in case of reconfiguration with sync within NR or to NR; otherwise it is optional present, need N. |
| HO | This field is optionally present, Need N, for reconfigWithSync within NR. Otherwise, it is not present. |

The RRCResume message received by the UE from the network may be used to resume the suspended RRC connection and use signalling radio bearer SRB1, RLC-SAP AM, and logical channel DCCH. The ASN1 text may include:

| RRCResume message |
| --- |
| -- ASN1START |
| -- TAG-RRCRESUME-START |
| RRCResume ::=      SEQUENCE { |
|   rrc-TransactionIdentifier      RRC-TransactionIdentifier, |
|   criticalExtensions      CHOICE { |
|     c1      CHOICE { |
|       rrcResume      RRCResume-IEs; |

| RRCResume message |
|---|
| ```
        spare3                      NULL,
        spare2                      NULL,
        spare1                      NULL
    },
        criticalExtensionsFuture    SEQUENCE { }
    }
}
RRCResume-IEs ::=       SEQUENCE {
    -- Configuration of Radio Bearers (DRBs, SRBs) including
    SDAP/PDCP.
        radioBearerConfig           RadioBearerConfig
                                    OPTIONAL, -- Need M
    -- Configuration of master cell group (NR Standalone):
        masterCellGroup             OCTET STRING (CONTAINING
    CellGroupConfig) OPTIONAL, -- Need M
        measConfig                  MeasConfig
        OPTIONAL, -- Need M
        drb-ContinueROHC            ENUMERATED {true}
        OPTIONAL, -- Need M
        fullConfig                  ENUMERATED {true}
        OPTIONAL, -- Need N
        lateNonCriticalExtension    OCTET STRING    OPTIONAL,
        nonCriticalExtension        SEQUENCE{ }     OPTIONAL
}
-- TAG-RRCRESUME-STOP
-- ASN1STOP
``` |

The RRCResume message IF field descriptions may include:

| fullConfig |
|---|
| Indicates that the full configuration option is applicable for the RRCResume message. |

The RRCReestablishment message received by the UE from the network may be used to re-establish SRB1 and use signalling radio bearer SRB1, RLC-SAP AM, and logical channel DCCH. The ASN1 text may include:

| RRCReestablishment message |
|---|
| ```
-- ASN1START
-- TAG-RRCREESTABLISHMENT-START
RRCReestablishment ::=  SEQUENCE {
    rrc-TransactionIdentifier       RRC-TransactionIdentifier,
    criticalExtensions              CHOICE {
        c1                              CHOICE{
            rrcReestablishment          RRCReestablishment-IEs,
            spare3 NULL, spare2 NULL, spare1    NULL
        },
        criticalExtensionsFuture        SEQUENCE { }
    }
}
RRCReestablishment-IEs ::= SEQUENCE {
    nextHopChainingCount            NextHopChainingCount,
    -- Configuration of Radio Bearers (SRB1)including PDCP.
        radioBearerConfig    RadioBearerConfig
        OPTIONAL, -- Need M
    -- Configuration of master cell group (NR Standalone):
        masterCellGroup             OCTET STRING (CONTAINING
    CellGroupConfig)    OPTIONAL, -- Need M
        fullConfig                  ENUMERATED {true}
        OPTIONAL, -- Need N
        lateNonCriticalExtension    OCTET STRING
        OPTIONAL,
        nonCriticalExtension        SEQUENCE { }
        OPTIONAL
}
-- TAG-RRCREESTABLISHMENT-STOP
-- ASN1STOP
``` |

The RRCReestablishment message IE field descriptions may include:

| fullConfig |
|---|
| Indicates that the full configuration option is applicable for the RRCReestablishment message. |

Figure 5:
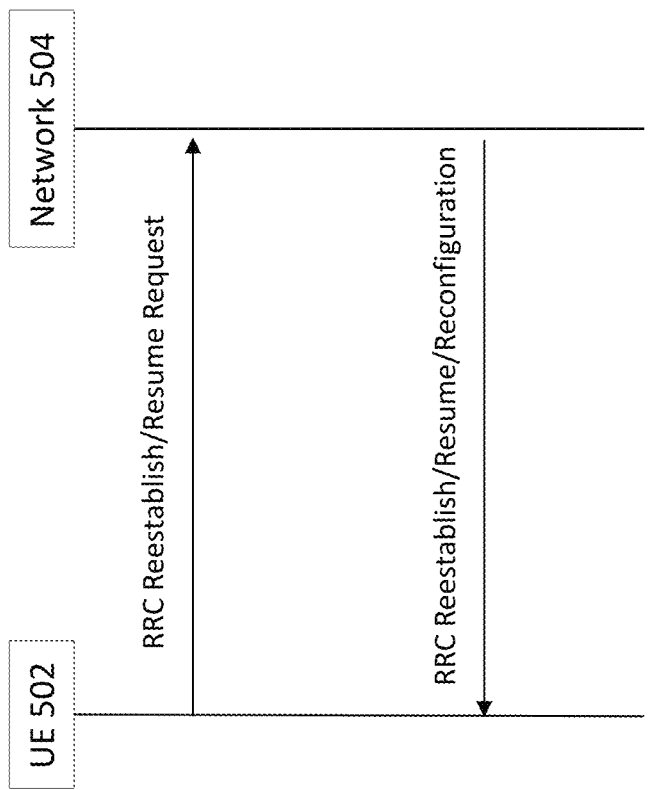
FIG. 5 illustrates a radio resource control (RRC) procedure in accordance with some embodiments.

FIG. 5 illustrates a RRC procedure in accordance with some embodiments. The procedure illustrates transmission of a RRCRestablishment/Resume Request from the UE 502 to the network (e.g., eNB/gNB) 504 and a RRCRestablishment/Resume/Reconfiguration message from the network 504 to the UE 502 in response. The RRC messages may be indicated as above. After generating the appropriate RRC message, the UE may determine SRB1 using the default SRB1 configuration stored in memory (which may be used prior to obtaining, from the network, a SRB1 configuration for the RRC connection). The UE may then submit the RRCReestablishmentRequest/RRCResumeRequest to lower layers for transmission to the network. In another embodiment, the UE may apply the default configuration after submitting the request message to the lower layers in order to receive the RRCReestablishment/RRCResume/RRCSetup message over SRB1 with the default configuration. The UE may receive the appropriate response (RRCReestablishment/RRCResume/RRCSetup) to the RRC message and generate and transmit an acknowledgment (e.g., RRCReestablishmentComplete/RRCResumeComplete/RRCSetupComplete) to the network. Note that after reception of the RRCReestablishment/RRCResume/RRCSetup message containing a new SRB1 configuration, the UE 502 may use the new SRB1 configuration for transmission of the acknowledgment (as well as other RRC messages). The default SRB1 configuration may be different from SRB1 configurations provided by the network after transmission of the RRC connection request.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a user equipment (UE), the apparatus comprising:
at least processor, arranged to:
store a default signaling radio bearer 1 (SRB1) configuration in a memory, wherein parameters of the default SRB1 configuration are:

|  | Value | | |
| --- | --- | --- | --- |
| Name | SRB1/1S | SRB2/2S | SRB3 |
| PDCP-Config | | | |
| >t-Reordering | | infinity | |
| RLC-Config CHOICE | | Am | |
| ul-RLC-Config | | | |
| >sn-FieldLength | | size12 | |
| >t-PollRetransmit | | ms45 | |
| >pollPDU | | infinity | |
| >pollByte | | infinity | |
| >maxRetxThreshold | | t8 | |
| dl-RLC-Config | | | |
| >sn-FieldLength | | size12 | |
| >t-Reassembly | | ms35 | |
| >t-StatusProhibit | | ms0 | |
| logicalChannelIdentity | 1 | 2 | 3 |
| LogicalChannelConfig | | | |
| >priority | 1 | 3 | 1 |
| >prioritisedBitRate | | infinity | |
| >logicalChannelGroup | | 0 | | generate a radio resource control (RRC) connection request for establishment of a RRC connection to a network;
encode the RRC connection request for transmission to the network; and
decode, from the network, a RRC connection response in response to the RRC connection request, the RRC connection response received using SRB1, rather than SRB0, wherein SRB1 uses the default SRB1 configuration stored in the memory.

2. The apparatus of claim 1, wherein the RRC connection response is a RRCReestablishment message.

3. The apparatus of claim 1, wherein the RRC connection response is a RRCResume message.

4. The apparatus of claim 1, wherein the RRC connection request is encoded using SRB1 having the default SRB1 configuration, with an indication that the RRC connection request is sent over SRB1, wherein the RRC connection request is a RRCConnectionRequest, RRCReestablishmentRequest or a RRCResumeRequest message.

5. The apparatus of claim 1, wherein the at least one processor is further configured to restore a RRC configuration and security context, except a stored SRB1 configuration, from a UE access stratum (AS) context stored in the memory when the RRC connection request is a RRCReestablishment request or RRCResume request.

6. The apparatus of claim 1, wherein the at least one processor is further configured to:
determine whether the RRC connection response contains a fullConfig information element (IE), and
in response to a determination that the RRC connection response contains the fullConfig IE, establish a new RRC connection.

7. The apparatus of claim 6, wherein the at least one processor is further configured to, in response to a determination that the RRC connection response does not contain the fullConfig 1E:
restore a Packet Data Convergence Protocol (PDCP) state of the UE, reset a COUNT value, and re-establish PDCP entities for SRB2 and all data radio bearers (DRBs),
if drb-ContinueROHC is included in the RRC connection response: indicate to lower layers that a UE access stratum (AS) context stored in the memory is used and that the drb-ContinueROHC 1E is configured and continue a header compression protocol context for DRBs configured with the header compression protocol, and
if drb-ContinueROHC is not included in the RRC connection response: indicate to the lower layers that the UE AS context is used, reset the header compression protocol context for the DRBs configured with the header compression protocol and discard the stored UE AS context and information I-Radio Network Temporary Identifier (RNTI).

8. The apparatus of claim 1, wherein the at least one processor is further configured to:
determine whether the RRC connection response contains a new SRB1 configuration, and
in response to a determination that the RRC connection response contains the new SRB1 configuration, use the new SRB1 configuration to transmit a new RRC message.

9. The apparatus of claim 1, wherein the at least one processor comprises:
a baseband processor configured to encode transmissions to, and decode transmissions from, the network.

10. The apparatus of claim 1, wherein the RRC connection request is encoded using SRB1 having the default SRB1 configuration.

11. An apparatus of a next generation NodeB (gNB), the apparatus comprising:
at least one processor arranged to:
decode a radio resource control (RRC) connection request for establishment of a RRC connection from a user equipment (UE); and
encode, for transmission to the UE using SRB1 having a default SRB1 configuration stored by the UE, rather than SRB0, a RRC connection response in response to the RRC connection request, wherein parameters of the default SRB1 configuration are:

|  | Value | | |
| --- | --- | --- | --- |
| Name | SRB1/1S | SRB2/2S | SRB3 |
| PDCP-Config | | | |
| >t-Reordering | | infinity | |
| RLC-Config CHOICE | | Am | |
| ul-RLC-Config | | | |
| >sn-FieldLength | | size12 | |
| >t-PollRetransmit | | ms45 | |

-continued

| Name | Value | | |
|---|---|---|---|
| | SRB1/1S | SRB2/2S | SRB3 |
| >pollPDU | | infinity | |
| >pollByte | | infinity | |
| >maxRetxThreshold | | t8 | |
| dl-RLC-Config | | | |
| >sn-FieldLength | | size12 | |
| >t-Reassembly | | ms35 | |
| >t-StatusProhibit | | ms0 | |
| logicalChannelIdentity | 1 | 2 | 3 |
| LogicalChannelConfig | | | |
| >priority | 1 | 3 | 1 |
| >prioritisedBitRate | | infinity | |
| >logicalChannelGroup | | 0; | | and
transmit the RRC connection response.

12. The apparatus of claim 11, wherein the RRC connection response is a RRCReestablishment message.

13. The apparatus of claim 11, wherein the RRC connection response is a RRCResume message.

14. The apparatus of claim 11, wherein the RRC connection request is encoded using SRB1 having the default SRB1 configuration, with an indication that the RRC connection request is sent over SRB1, wherein the RRC connection request is a RRCConnectionRequest, RRCReestablishmentRequest or a RRCResumeRequest message.

15. The apparatus of claim 11, wherein the RRC connection response contains at least one of:
a fullConfig information element (IE) to cause the UE to establish a new RRC connection, or
a new SRB1 configuration for use by the UE in subsequent RRC communications with the gNB instead of the default SRB1 configuration.

16. A non-transitory computer accessible memory medium storing program instructions, wherein the program instructions are executable by one or more processors of a user equipment (UE) to:
store a default signaling radio bearer 1 (SRB1) configuration in a memory, wherein parameters of the default SRB1 configuration are:

| Name | Value | | |
|---|---|---|---|
| | SRB1/1S | SRB2/2S | SRB3 |
| PDCP-Config | | | |
| >t-Reordering | | infinity | |
| RLC-Config CHOICE | | Am | |
| ul-RLC-Config | | | |
| >sn-FieldLength | | size12 | |
| >t-PollRetransmit | | ms45 | |
| >pollPDU | | infinity | |
| >pollByte | | infinity | |
| >maxRetxThreshold | | t8 | |
| dl-RLC-Config | | | |
| >sn-FieldLength | | size12 | |
| >t-Reassembly | | ms35 | |
| >t-StatusProhibit | | ms0 | |
| logicalChannelIdentity | 1 | 2 | 3 |
| LogicalChannelConfig | | | |
| >priority | 1 | 3 | 1 |
| >prioritisedBitRate | | infinity | |
| >logicalChannelGroup | | 0; | | generate a radio resource control (RRC) connection request for establishment of a RRC connection to a network;
encode the RRC connection request for transmission to the network; and
decode, from the network, a RRC connection response in response to the RRC connection request, the RRC connection response received using SRB1, rather than SRB0, wherein SRB1 uses the default SRB1 configuration stored in the memory.

17. The non-transitory computer accessible memory medium of claim 16, wherein the RRC connection request is encoded using SRB1 having the default SRB1 configuration.

18. The non-transitory computer accessible memory medium of claim 16, wherein the program instructions are further executable to restore a RRC configuration and security context, except a stored SRB1 configuration, from a UE access stratum (AS) context stored in the memory when the RRC connection request is a RRCReestablishment request or RRCResume request.

19. The non-transitory computer accessible memory medium of claim 16, wherein the program instructions are further executable to:
determine whether the RRC connection response contains a fullConfig information element (IE), and
in response to a determination that the RRC connection response contains the fullConfig IE, establish a new RRC connection.

20. The non-transitory computer accessible memory medium of claim 16, wherein the program instructions are further executable to:
determine whether the RRC connection response contains a new SRB1 configuration, and
in response to a determination that the RRC connection response contains the new SRB1 configuration, use the new SRB1 configuration to transmit a new RRC message.

* * * * *